United States Patent
Xu et al.

(10) Patent No.: US 10,237,041 B2
(45) Date of Patent: Mar. 19, 2019

(54) METHOD AND APPARATUS FOR SELF-CONFIGURATION AND SELF-OPTIMIZATION IN A WIRELESS COMMUNICATION SYSTEM

(71) Applicant: Samsung Electronics Co., Ltd, Gyeonggi-do (KR)

(72) Inventors: Lixiang Xu, Beijing (CN); Hong Wang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/236,368

(22) Filed: Aug. 12, 2016

(65) Prior Publication Data
US 2017/0048725 A1 Feb. 16, 2017

(30) Foreign Application Priority Data

Aug. 12, 2015 (CN) .......................... 2015 1 0494452
Aug. 14, 2015 (CN) .......................... 2015 1 0501880

(51) Int. Cl.
*H04M 1/00* (2006.01)
*H04L 5/00* (2006.01)
(Continued)

(52) U.S. Cl.
CPC .......... *H04L 5/0055* (2013.01); *H04W 24/02* (2013.01); *H04W 88/08* (2013.01)

(58) Field of Classification Search
CPC ... H04W 16/26; H04W 24/02; H04W 84/045; H04W 36/04; H04W 36/22; H04W 24/08;
(Continued)

(56) References Cited

U.S. PATENT DOCUMENTS 7,920,510 B2 * 4/2011 Kim .................. H04L 29/12273
370/328
2005/0233752 A1 * 10/2005 Laroia ................... H04L 5/0007
455/450
(Continued)

FOREIGN PATENT DOCUMENTS

WO 2014154277 A1 10/2014
WO 2014163553 A1 10/2014
(Continued)

OTHER PUBLICATIONS

"AAS Cell Configuration Change Notification," 3GPP TSG-RAN3 Meeting #87bis, R3-151050, Ericsson, Tenerife, Santa Cruz, Spain, Apr. 20-24, 2015, 11 pages.
(Continued)

*Primary Examiner* — Nhan T Le

(57) ABSTRACT

The present disclosure relates to a pre-5th-Generation (5G) or 5G communication system to be provided for supporting higher data rates Beyond 4th-Generation (4G) communication system such as Long Term Evolution (LTE). An apparatus implements a method for self-configuration and self-optimization. A method for operating a base station (BS) in a wireless communication network comprises transmitting a message including information on coverage modification indicating whether the message is for pre-notification of cell re-configuration, to another BS, and receiving an acknowledgement message from the another BS.

15 Claims, 12 Drawing Sheets

(51) Int. Cl.
*H04W 24/02* (2009.01)
*H04W 88/08* (2009.01)

(58) Field of Classification Search
CPC . H04W 16/32; H04W 88/02; H04W 36/0088; H04W 52/0206; H04W 88/08; H04W 36/30; H04W 36/14; H04W 36/24; H04W 48/18; H04W 76/19; H04W 84/18; H04L 5/0055
See application file for complete search history.

(56) References Cited

U.S. PATENT DOCUMENTS

| | | | |
|---|---|---|---|
| 2009/0017828 | A1 | 1/2009 | Lee et al. |
| 2012/0264417 | A1* | 10/2012 | Gao .................. H04W 36/0083 455/422.1 |
| 2015/0327098 | A1* | 11/2015 | Chai ..................... H04W 24/08 370/252 |
| 2016/0338008 | A1* | 11/2016 | Xia ....................... H04W 48/10 |
| 2017/0099693 | A1* | 4/2017 | Deng .................. H04W 76/025 |

FOREIGN PATENT DOCUMENTS

| | | |
|---|---|---|
| WO | 2015005729 A1 | 1/2015 |
| WO | 2015028043 A1 | 3/2015 |

OTHER PUBLICATIONS

"Indication Alternatives for Intra LTE AAS Cell Change Notification," 3GPP TSG RAN WG#88, R3-151156, China Unicom, Fukuoka, Japan, May 25-29, 2015, 4 pages.

"AAS Cell Shape Inidcation Notification," 3GPP TSG-RAN WG3 Meeting #88, R3-151160, CMCC, Fukuoka, Japan, May 25-29, 2015, 4 pages.

Foreign Communication From a Related Counterpart Application, PCT Application No. PCT/KR2016/008912, International Search Report and Written Opinion dated Nov. 25, 2016, 9 pages.

Extended European Search Report regarding Application No. 16835489.2, dated Jun. 25, 2018, 8 pages.

* cited by examiner

METHOD AND APPARATUS FOR SELF-CONFIGURATION AND SELF-OPTIMIZATION IN A WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Chinese patent applications filed on Aug. 12, 2015 in the State Intellectual Property Office of the P.R.C and assigned Serial number 201510494452.4, and filed on and Aug. 14, 2015 in the State Intellectual Property Office of the P.R.C and assigned Serial number 201510501880.5, the entire disclosure of which is hereby incorporated by reference.

TECHNICAL FIELD

The present disclosure relates to mobile communication systems, and especially to a method, a system, and an apparatus for self-configuration and self-optimization.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The existing solutions still cannot effectively solve the problem of re-establishment failure during SAE system self-optimization, in the scenarios of cell splitting/merging and cell shaping.

SUMMARY

A method for self-configuration and self-optimization is provided according to embodiments of the present disclosure. The method may be able to solve the problems of re-establishment failure subsequently after a handover failure of a user equipment (UE) and mobility robustness optimization (MRO) during a self-optimization procedure of a system architecture evolution (SAE) system in scenarios of cell splitting/cell merging and cell shaping.

A system for self-configuration and self-optimization is provided according to embodiments of the present disclosure. The system may be able to solve the problems of re-establishment failure subsequently after a handover failure of a UE and MRO during a self-optimization procedure of an SAE system in scenarios of cell splitting/cell merging and cell shaping.

An apparatus for self-configuration and self-optimization is provided according to embodiments of the present disclosure. The apparatus may be able to solve the problems of re-establishment failure subsequently after a handover failure of a UE and MRO during a self-optimization procedure of an SAE system in scenarios of cell splitting/cell merging and cell shaping.

To achieve the objects, technical schemes of the embodiments of the present disclosure are implemented as follows.

A method for self-configuration and self-optimization, includes: notifying, by a base station (BS) which controls a coverage modification cell, information on coverage modification to a second BS before or after performing cell re-configuration.

A system for self-configuration and self-optimization, includes: a BS which controls a coverage modification cell and a second BS, in which the BS which controls the coverage modification cell is to notify information on coverage modification to a second BS before or after cell re-configuration; and the second BS is to make multiple preparations for a handover, and/or save or update modification information of the coverage modification cell, and/or save or retrieve a MRO status of a modified cell according to the information on coverage modification.

A BS for self-configuration and self-optimization, which controls a coverage modification cell, includes: a configuring module and an instructing module, in which the configuring module is to perform cell re-configuration; and the instructing module is to notify information on cell coverage modification to a second BS after performing the cell re-configuration.

A second BS for self-configuration and self-optimization, includes a receiving module and a processing module, in which the receiving module is to receive information on coverage modification sent from a BS which controls a coverage modification cell; and the processing module is to make multiple preparations for a handover, and/or save or update modification information of a coverage modification cell, and/or save or retrieve a MRO status of a modified cell according to the received information on coverage modification.

In the method, system, and apparatus provided according to the embodiments of the present disclosure, a BS which controls a coverage modification cell notifies information on coverage modification to a second BS. The second BS saves or updates modification information of a coverage modification cell, and/or saves or retrieves a MRO status of a related cell, and/or makes multiple preparations for a handover. In this way, the embodiments of the present disclosure enable the second BS to properly save, retrieve a MRO status of a coverage modified cell, to know the cells to be served as the multiple preparations for the handover in time to solve the problem of re-establishment failure; and release unnecessary information such as PCIs in time, so as to use radio resources and system resources to the most extent, better support MRO, and improve performance of the mobile communication system. Therefore, the embodiments of the present disclosure may be able to solve the problems of re-establishment failure subsequently after a handover failure of a UE and MRO during a self-optimization procedure of an SAE system in scenarios of cell splitting/cell merging and cell shaping.

In one embodiment, a method for operating a BS in a wireless communication network comprises transmitting a message including information on coverage modification indicating whether the message is for pre-notification of cell re-configuration, to another BS, and receiving an acknowledgement message from the another BS.

In another embodiment, a BS in a wireless communication network comprises a a controller configured to perform cell re-configuration, and a communication unit configured to transmit a message including information on coverage modification indicating whether the message is for pre-notification of the cell re-configuration, to another BS, and receive an acknowledgement message from the another BS.

In still another embodiment, a BS in a wireless communication network comprises a communication unit configured to receive a message including information on coverage modification indicating whether the message is for pre-notification of cell re-configuration, from another BS, and a controller configured to operate for avoiding connection or re-establishment failure during the cell re-configuration based on the information on coverage modification.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

For better understanding of the objects, technical solutions, and advantages of the present disclosure, the present disclosure will be described more fully hereinafter with reference to the accompanying drawings and embodiments.

Figure 1:
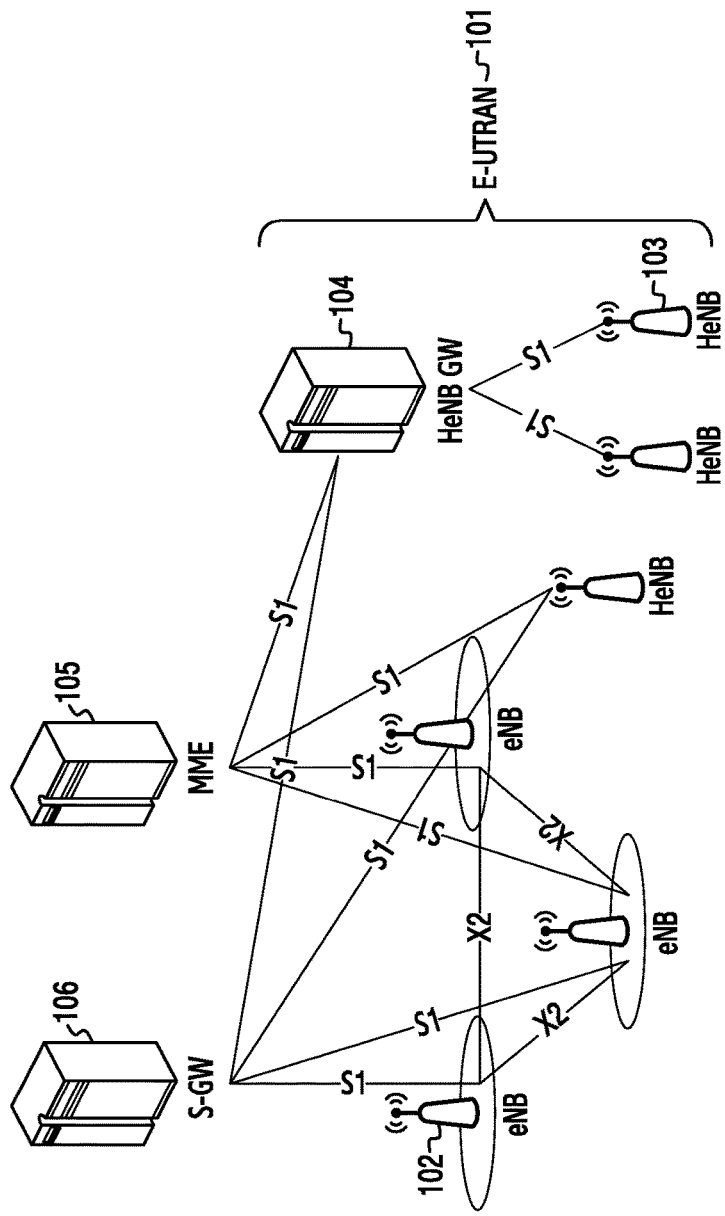
FIG. 1 illustrates a schematic diagram of a structure of a system architecture evolution (SAE) system.

With the development of communication techniques, mobile communication systems have evolved to system architecture evolution (SAE) systems. FIG. 1 illustrates a schematic diagram of a structure of an SAE system. As shown in FIG. 1, the system includes an evolved universal mobile telecommunications system (UMTS) terrestrial radio access network (E-UTRAN) 101 and a core network, which at least includes a mobility management entity (MME) 105 and a user plane entity (serving-gateway (S-GW)) 106. The E-UTRAN 101 is configured to connect a user equipment (UE) to the core network. The E-UTRAN 101 may further include at least one macro enhanced NodeB (eNB) 102 and home enhanced NodeB (HeNB) 103, and may optionally include a home enhanced NodeB gateway (HeNB GW) 104. The MME 105 and the S-GW 106 may be integrated into a single module, or may be implemented separately. The eNBs 102 are connected with each other through X2 interfaces, and are connected to the MME 105 and the S-GW 106 through S1 interfaces. The HeNBs 103 are directly connected to the MME 105 and the S-GW 106 through S1 interfaces respectively, or are connected with the optional HeNB GW 104 through S1 interfaces, and then the HeNB GW 104 is connected to the MME 105 and the S-GW 106 through S1 interfaces respectively.

At initial establishment of the SAE system, or during the operation of the SAE system, a great amount of manpower and material resources is the cost to configure and optimize parameters of the SAE system, especially settings of radio parameters, so as to provide good coverage and capacity, mobility robustness, mobility load balance, UE accessing rate, etc. To save the manpower and material resource costs for the configuration during the operation of the SAE system, a method for self-optimization of the SAE system is one proposed solution. During a self-optimization process, settings of an eNB or HeNB are optimized based on a current status of the SAE system. Bothe eNB and HeNB are referred to as "eNB" hereinafter to illustrate the method for self-optimization of the SAE system.

Figure 2:
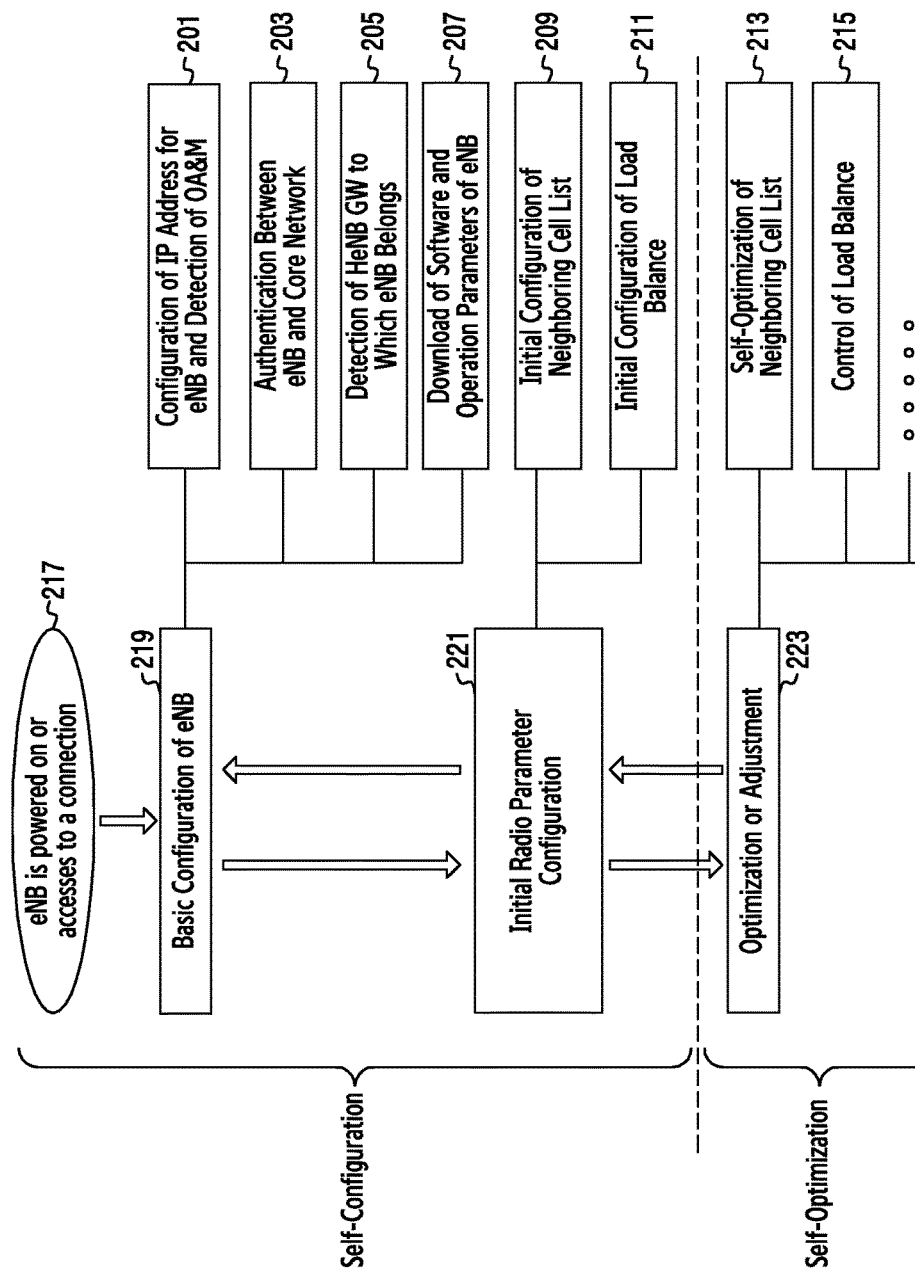
FIG. 2 illustrates a schematic diagram of a basic principle of performing self-optimization for an SAE system.

FIG. 2 illustrates a schematic diagram of a basic principle for self-optimization of an SAE system. As shown in FIG. 2, upon the powering on of an eNB, or upon access to the SAE system by the eNB (block 217), a self-configuration process which involves basic configuration and initial radio parameter configuration of the eNB may be carried out. In block 219, the basic configuration of the eNB includes configuration of an internet protocol (IP) address for the eNB, and detection of operations, administration and maintenance (OA&M) (block 201); authentication between the eNB and the core network (block 203); in case of the eNB being a HeNB, detection of a HeNB GW to which the eNB belongs (block 205); and download of software and operation parameters of the eNB to perform self-configuration (block 207). In block 221, initial radio parameter configuration may be carried out according to experience or simulation. Since performance of respective eNBs in the SAE system may be affected by environments where the respective eNBs are located, the eNBs need to perform initial radio parameter configuration (block 221) according to the environments where the eNBs are located, and especially perform an initial configuration of neighboring cell list (block 209) and an initial configuration of load balance (block 211). After the self-configuration procedure, since a lot of parameters configured for the eNBs may not be optimal, it is necessary to optimize or adjust configurations of the eNBs (block 223), so that the SAE has better performance, which is also referred to as self-optimization of the mobile communication system. A backstage OA&M may control an eNB to optimize or adjust configurations of the eNB. There may be a standard interface between the OA&M and the eNB, and the OA&M may send parameters to be optimized through the interface to the eNB. The eNB may be an eNB or a HeNB. Then, the eNB may optimize parameters configured for it according to the parameters to be optimized. Of course, the process may be carried out by the eNB itself. That is, the eNB detects and obtains performance to be optimized, and then optimizes and adjusts parameters corresponding to it. Optimization or adjustment of the configurations of eNB may include: neighboring cell list self-optimization (block 213), coverage and capacity self-optimization, mobility robustness self-optimization, load balance self-optimization (block 215), and random access channel (RACH) parameter self-optimization.

In a scenario where cell coverage is modified, three adaptive antenna system (AAS) scenarios: cell shaping, cell splitting/merging, and cell beamforming need to be considered for self-configuration and self-optimization. In the scenarios of cell splitting/merging and of cell shaping, a problem of re-establishment failure and a problem of mobility robustness optimization (MRO) may be caused subsequently after a handover failure of a UE. There is not yet a comprehensive solution to solve the problem of re-establishment failure and the problem of MRO. For example, if a cell C is split into a cell D and a cell E, how will a base station (BS) that controls the cell C notify the status of the cell C to a neighboring BS? If the cell C is put in a deleted-cell list, then the neighboring BS may delete information related to the cell C. In this case, the neighboring BS will not be able to save parameters related to mobility of the cell C, and next time when the cell C is changed to be active, the neighboring BS cannot retrieve the parameters related to self-optimization (mobility robustness optimization) of the cell C. However, if the cell C is not put in deleted-serving cell information, even if the cell C is not working, some information, such as a physical-layer cell identity (PCI) of the cell C, cannot be released in time, and thus, PCI conflicts may occur, which is disadvantageous for system planning.

Again, the existing solutions still cannot effectively solve the problem of re-establishment failure during SAE system self-optimization, in the scenarios of cell splitting/merging and cell shaping.

As described above, a reason that causes the problems of re-establishment failure subsequently after a handover failure of a user equipment (UE) and mobility robustness optimization (MRO), during a self-optimization procedure of a system architecture evolution (SAE) system in the scenarios of cell splitting/cell merging and cell shaping is that a second base station (BS) may not be able to know cells to be served as multiple preparations for the handover in time, and may not be able to know modification information of the coverage modification cell in a BS which controls a coverage modification cell. In view of the foregoing, in the embodiments of the present disclosure, the BS that controls the coverage modification cell notifies information on coverage modification to the second BS, so that the second BS saves or updates information of the coverage modification cell, and/or saves or retrieves the MRO status of a related cell, and/or makes multiple preparations for the handover.

In this way, the embodiments of the present disclosure enable the second BS to properly save, and retrieve the MRO status of the coverage modification cell, to know the cells to be served as the multiple preparations for the handover in time to solve the problem of re-establishment failure, and release unnecessary information such as physical cell identities (PCIs), so as to use radio resources and system resources to the most extent, better support MRO, and improve performance of the mobile communication system.

Figure 3:
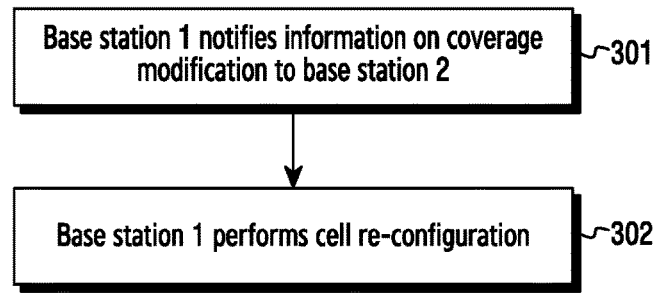
FIG. 3 illustrates a first self-configuration and self-optimization method provided according to embodiments of the present disclosure.

FIG. 3 illustrates a first self-configuration and self-optimization method provided according to embodiments of the present disclosure. The detailed process of the method may be as follows.

Step 301, a BS 1 notifies a BS 2 of information on coverage modification.

The BS 1 is a BS that controls a coverage modification cell. The BS controls a cell with modified coverage. The BS 2 may be a BS that has an X2 interface with the BS 1, or a neighboring BS of the BS 1.

In step 301, the information on coverage modification may include one or more kinds of following information: a cell identity of the cell with modified coverage, i.e., an evolved universal mobile telecommunications system (UMTS) terrestrial radio access network (E-UTRAN) cell global identifier (ECGI); a cell coverage status of the cell with modified coverage; cell replacing information related to the cell with modified coverage; a cell deployment status indication of the cell with modified coverage, i.e., indicating whether the information on coverage modification is a notification before coverage modification or a notification after coverage modification. That is, the information on coverage modification may include a cell identity of the coverage modification cell, i.e., an E-UTRAN cell global identifier (ECGI); a cell coverage status of the coverage modification cell; a list of associated cells of the coverage modification cell; a coverage deployment status indication of the coverage modification cell, i.e., indicating whether the information on coverage modification is a notification before coverage modification or a notification after coverage modification. The information on coverage modification comprises cell replacing information related to the cell with modified coverage, when the information on coverage modification includes the cell deployment status indicator. The cell deployment status indicator in the information on coverage modification indicates that the cell coverage status is planned to be used at the next re-configuration.

In step 301, the coverage deployment status indication may be set as potential deployment to indicate that the information on coverage modification is a notification before coverage modification. That is, the information on coverage modification indicates pre-notification of cell re-configuration. In case of absence of the coverage deployment status indication, it means that the information on coverage modification is a notification after coverage modification. That is, the information on coverage modification indicates post-notification of the cell re-configuration. The message including the information on coverage modification is for pre-notification of the cell re-configuration, when the information on coverage modification includes a cell deployment status indicator and the cell deployment status indicator indicates pre-change-notification or potential deployment. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

In the method of the present disclosure, the BS 1 may not send information elements of the coverage deployment status indication to the BS 2, but may let the BS 2 know whether the information on coverage modification is a notification before coverage modification or a notification after coverage modification by implicit approaches. There may be two implicit approaches to let the BS 2 know whether the information on coverage modification is a notification before coverage modification or a notification after coverage modification as follows. That is, there may be two implicit approaches to let the BS 2 know whether the information on coverage modification indicates pre-notification of cell re-configuration or post-notification of the cell re-configuration.

Approach 1: corresponding to notification before coverage modification, the information on coverage modification sent from the BS 1 to the BS 2 contains information elements of the list of associated cells of the coverage modification cell. While corresponding to notification after coverage modification, the BS 1 may not contain the information elements of the list of associated cells of the coverage modification cell in the information on coverage modification, because the BS 2 had received and saved information on the associated cells after it received a notification before coverage modification.

Approach 2: the BS 2 may know whether the information on coverage modification received from the BS 1 is a notification before cell re-configuration, or a notification after cell re-configuration based on the cell identity and the cell coverage status of the coverage modification cell. Corresponding to notification before coverage modification, the cell coverage status of the coverage modification cell is the same as an existing status. Being the same as an existing status means that the cell coverage status of the coverage modification cell is the same as a status of a corresponding cell saved by the BS 2 (e.g., both are either inactive, or active), or the cell coverage status of the coverage modification cell is inactive but there is no information on the corresponding cell at the BS 2. Corresponding to notification after coverage modification, the cell coverage status of the coverage modification cell received by the BS 2 is different from a status of the coverage modification cell saved by the BS 2.

In the method of the present disclosure, there may be only a notification before coverage modification, or only a notification after coverage modification, or both a notification before coverage modification and a notification after coverage modification. When there is only a notification after coverage modification, the step 301 is executed after step 302. When there are both a notification before coverage modification and a notification after coverage modification, the notification before coverage modification is notified in the step 301, and the notification after coverage modification is notified after step 302.

In step 301, the cell coverage status of the coverage modification cell indicates an inactive status or an active status of the coverage modification cell.

Corresponding to notification before coverage modification, the BS 1 put information of a cell, which is currently in the inactive status, in information of serving cells to be modified, or in information of serving cells to be added. That is, the BS put information of a cell with modified coverage is included in information of served cells to be modified or in information of served cells to be added. If it is the first time to make a cell re-configuration preparation to generate the cell in the inactive status, then the information of the cell will be contained in the information of the serving cells to add. If the cell in the inactive status has once been activated, then the information of the cell will be contained in the information of the serving cell to be modified. The BS 1 may allocate a new PCI for the cell, and contain the new PCI in the information of the serving cells to be modified. After the BS 2 receives the information on coverage modification, it may save information of a modified serving cell or information of an added serving cell.

Corresponding to notification after coverage modification, the BS 1 may release a PCI of the cell in the inactive status. The BS 1 saves an ECGI of the cell in the inactive status. After the BS 2 receives the notification after coverage modification, it will know that the PCI of the corresponding cell in the inactive status has been released.

In step 301, when the information on coverage modification contains a notification before coverage modification, then the BS 2 may make multiple preparations for a handover, and the BS 2 saves information of a modified serving cell and/or modification information of a coverage modification cell; when the information on coverage modification contains a notification after coverage modification, then the BS 2 may retrieve a MRO status of a cell in the active status, and save a MRO status of a cell in the inactive status. The BS 2 may operate for avoiding connection or re-establishment failure during the cell re-configuration based on the information on coverage modification received from the BS 1.

Corresponding to a coverage modification cell whose cell coverage status is inactive, the BS may not initiate a handover to the coverage modification cell.

Step 302, the BS 1 performs cell re-configuration. The cell re-configuration includes cell splitting, cell merging, and cell shaping.

Figure 4:
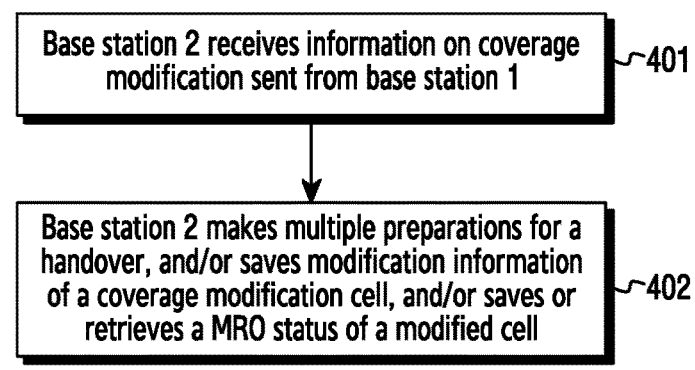
FIG. 4 illustrates a second self-configuration and self-optimization method provided according to embodiments of the present disclosure.

FIG. 4 illustrates a second self-configuration and self-optimization method provided according to embodiments of the present disclosure. The detailed process of the method may be as follows.

Step 401, the BS 2 receives information on coverage modification sent from the BS 1.

In step 401, information on coverage modification may include one or more kinds of following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the information on coverage modification may include a cell identity of a coverage modification cell, i.e., an ECGI; a cell coverage status of the coverage modification cell; a list of associated cells of the coverage modification cell; a coverage deployment status indication of the coverage modification cell, i.e., indicating whether the information on coverage modification is a notification before coverage modification or a notification after coverage modification. To be consistent with the foregoing description of step 301, if the coverage deployment status indication is set to be potential deployment, then it shows that the information on coverage modification is a notification before coverage modification. That is, if the cell deployment status indicator indicates pre-change-notification or potential deployment, then a message regarding the information on coverage modification is pre-notification of the cell re-configuration. The message including the information on coverage modification is for pre-notification of the cell re-configuration, when the information on coverage modification includes a cell deployment status indicator and the cell deployment status indicator indicates pre-change-notification or potential deployment. If the coverage deployment status indication is not present, then it shows that the information on coverage modification is a notification after coverage modification. Or the BS 1 may let the BS 2 know whether the information on coverage modification is a notification before coverage modification or a notification after coverage modification by an implicit approach. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

In step 401, the cell coverage status of the coverage modification cell indicates an inactive status or an active status of the coverage modification cell.

Step 402, based on the received information on coverage modification, the BS 2 makes multiple preparations for a handover, and/or saves or updates modification information of the coverage modification cell, and/or saves or retrieves a MRO status of a modified cell. That is, the BS 2 may operate for avoiding connection or re-establishment failure during the cell re-configuration based on the information on coverage modification received from the BS 1.

The BS 2 saves information of a serving cell to be added or information on a serving cell to be modified. The BS 2 saves the status information of the coverage modification cell.

In the method of the present disclosure, there may be three approaches for the BS 2 to learn whether the information on coverage modification is a notification before coverage modification or a notification after coverage modification. That is, there may be three approaches for the BS 2 to learn whether the information on coverage modification indicates pre-notification of cell re-configuration or post-notification of the cell re-configuration.

Approach 1: the BS 2 may learn whether the received information on coverage modification is a notification before coverage modification or a notification after coverage modification according to whether the received information on coverage modification contains a coverage deployment status indication. If a coverage deployment status indication is contained and a value thereof is "pre-notification" or "potential deployment", then the information on coverage modification is a notification before coverage modification. That is, the message including the information on coverage modification is for pre-notification of the cell re-configuration, when the information on coverage modification includes a cell deployment status indicator and the cell deployment status indicator indicates pre-change-notification or potential deployment. The cell deployment status indicator in the information on coverage modification indicates that a cell coverage status is planned to be used at next re-configuration. If a coverage deployment status indication is contained and a value thereof is "after modification", or a coverage deployment status indication is not received, then the information on coverage modification is a notification after coverage modification.

Approach 2: the BS 2 may learn whether the received information on coverage modification is a notification before coverage or a notification after coverage modification according to whether the received coverage modification information contains information elements of the list of associated cells of the coverage modification cell. If the information elements of the list of associated cells of the coverage modification cell are received, then the information on coverage modification is a notification before coverage modification. That is, the coverage modification is planned to be occurred at next re-configuration. Or if the information elements of the list of associated cells of the coverage modification cell are not received, then the information on coverage modification is a notification after coverage modification.

Approach 3: the BS 2 learns whether the information on coverage modification received from the BS 1 is a notification before cell re-configuration or a notification after cell re-configuration according to a cell identity and a cell coverage status of the coverage modification cell. Corresponding to notification before coverage modification, the cell coverage status of the coverage modification cell is the same as an existing status. Being the same as an existing status means that the cell coverage status of the coverage modification cell is the same as a status of a corresponding cell saved by the BS 2 (e.g., both are either inactive, or active), or the cell coverage status of the coverage modification cell in the received information on coverage modification is inactive but currently the BS 2 has no information of a corresponding cell. Corresponding to notification after coverage modification, the cell coverage status of the coverage modification cell received by the BS 2 is different from a status of the coverage modification cell saved by the BS 2.

In step 402, when the information on coverage modification includes a notification before coverage modification, then the BS 2 makes multiple preparations for a handover. That is, the BS 2 may operate for avoiding connection or re-establishment failure during the cell re-configuration based on the information on coverage modification received from the BS 1. When the BS 2 initiates a handover of the UE to a cell of the BS 1, the BS 2 contains information of the coverage modification cell in re-establishing information of a handover request, which case may be implemented in a cell shaping scenario; or when the BS 2 initiates the handover of the UE to the cell of the BS 1, it may contain information on a cell in the inactive status among coverage modification cells in the re-establishment information of the handover request; or when the BS 2 initiates the handover of the UE to the cell of the BS 1, it contains information of a cell newly added or modified and in the inactive status in the re-establishment information of the handover request; or when the BS 2 initiates a handover to a coverage modification cell, the BS 2 contains information of an associated cell in the inactive status or information of an associated cell among the coverage modification cells in re-establishment information of a handover request. In this way, if during a handover, a cell of the BS 1 is re-configured, the method provides that the re-establishment of the UE is successful in a cell in the active status after re-configuration, and avoids a re-establishment failure.

When the information on coverage modification contains a notification after coverage modification, the BS 2 retrieves a MRO status of a cell in the active status, saves an ECGI and a MRO status of a cell in the inactive status. The BS 2 can know that the BS 1 may have released a PCI of the cell in the inactive status. The BS 2 may release the PCI information of the cell in the inactive status.

The present disclosure will be described in details hereinafter by detailed embodiments, in which the BS 1 is a BS which controls a coverage modification cell, and the BS 2 is a BS that has an X2 interface with the BS 1 or a neighboring BS of the BS 1. The BS controls a cell with modified coverage.

Figure 5:
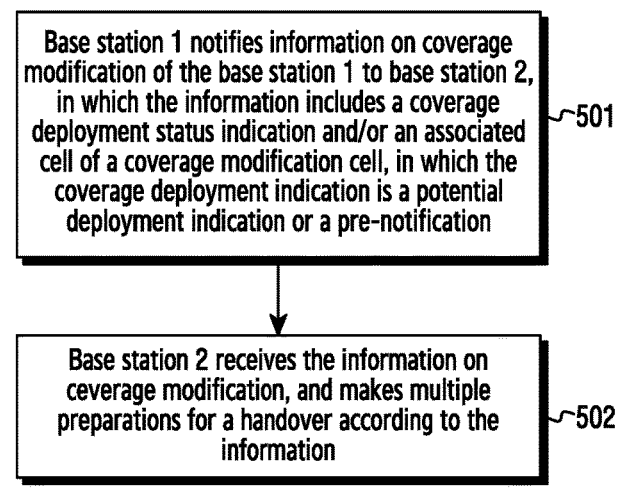
FIG. 5 illustrates a first self-optimization method which supports a cell coverage modification scenario provided according to embodiments of the present disclosure.

FIG. 5 illustrates a first self-optimization method which supports a cell coverage modification scenario according to embodiments of the present disclosure. The flow is applicable for notification before cell coverage modification. As shown in FIG. 5, the flow includes the following process.

Step 501, the BS 1 notifies information on cell coverage modification of the BS 1 to the BS 2. The information on cell coverage modification includes a coverage deployment status indication and/or an associated cell of the coverage modification cell. When the coverage deployment status indication is a potential deployment status indication, then the information on cell coverage modification is a notification before coverage modification. That is, a message including the information on coverage modification is for pre-notification of the cell re-configuration, when the information on coverage modification includes a cell deployment status indicator and the cell deployment status indicator indicates pre-change-notification or potential deployment. The cell deployment status indicator in the information on coverage modification indicates that a cell coverage status is planned to be used at next re-configuration. The BS 1 may let the BS 2 know the information on cell coverage modification is a notification before coverage modification by an implicit approach, a detail process of which is the same as that in step 301, and will not be elaborated herein.

In step 501, the information on cell coverage modification includes one or more kinds of following information: a cell identity of the cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the information on coverage modification may include a cell identity of the coverage modification cell, i.e., an ECGI; a cell coverage status of the coverage modification cell; a list of associated cells of the coverage modification cell; a coverage deployment status indication of the coverage modification cell, i.e., indicating whether the information on cell coverage modification is a notification before coverage modification or a notification after coverage modification. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

In step 501, the cell coverage status is configured to indicate whether the coverage modification cell is in the inactive status or in the active status, and when the coverage modification cell is in the active status, different values corresponding to different cell coverage status.

The list of associated cells of the coverage modification cell refers to one or more cells as follows. For example, if a coverage modification cell is cell B, and a cell which is associated with the cell B is cell A, then the cell A and the cell B may have common, or overlapped, or adjacent coverage when they are active. For example, in a situation where cell C can be split into cell D and cell E, a cell which is associated with the cell D and the cell E is the cell C. In a situation where cell X and cell Y can be merged as cell Z, cells which are associated with the cell Z are the cell X and the cell Y. For cell shaping, e.g., re-configuration of cell H, if a coverage area of the cell H is changed due to cell shaping of the cell H, and the change of the coverage area of the cell H needs neighboring cell M and cell N to change their coverage, or needs compensation by coverage of the neighboring cell M and cell N, the cell M and the cell N are associated cells of the cell H.

Corresponding to the situation where the cell C under the BS 1 is to be split into the cell D and the cell E, corresponding to notification before the cell splitting, information of the cell D and the cell E will be contained in information of served cell to be added sent from the BS 1 to the BS 2. The information on cell coverage modification contains the cell D and the cell E, and status of the cell D and cell E are inactive. The associated cell of both the cell D and the cell E is the cell C. The information on cell coverage modification contains an indication of potential deployment or pre-notification.

If after establishment of the X2 interface between the BS 1 and the BS 2, it is the first time that the cell C is to be split into the cell D and the cell E, i.e., information of the cell D and the cell E having not been notified to the BS 2, then the information of the cell D and the cell E will be contained in information of served cells to be added sent from the BS 1 to the BS 2. If it is not the first time that the cell C is to be split into the cell D and the cell E, i.e., the information of the cell D and the cell E having been notified to the BS 2, then the information of the cell D and the cell E will be contained in information of served to be modified cells sent from the BS 1 to the BS 2. The BS 1 may re-allocate resources such as PCIs for the cell D and the cell E.

Step 502, the BS 2 receives the information on cell coverage modification. The BS 2 saves received information, and the BS 2 saves information of served cells to be added or information of served cells to be modified. The BS 2 saves status information of a coverage modification cell. The BS 2 saves information of an associated cell of a cell in the inactive status. For a serving cell to be modified, the BS 2 uses received information to cover previously saved information of the serving cell.

The BS 2 may know that the received information on cell coverage modification is a notification before coverage modification by three approaches, a detail procedure of which is similar to that in step 402, and will not be elaborated herein.

The BS 2 makes multiple preparations for a handover according to the received information on cell coverage modification. That is, the BS 2 may operate for avoiding connection or re-establishment failure during the cell re-configuration based on the information on coverage modification received from the BS 1. When the BS 2 initiates a handover to a cell of the BS 1, it may contain information of a coverage modification cell in re-establishment information of a handover request, which case for example may be applicable for the cell shaping scenario; or when the BS 2 initiates a handover to a cell of the BS 1, it may contain information of a cell in the inactive status among coverage modification cells in re-establishment information of a handover request; or when the BS 2 initiates a handover of the UE to a cell of the BS 1, it may contain information of a cell newly added or modified and in the inactive status in re-establishment information of a handover request; or when the BS 2 initiates a handover to a coverage modification cell, the BS 2 contains information of an associated cell in the inactive status or information of an associated cell among the coverage modification cells in re-establishment information of a handover request. In this way, if during a handover, a cell of the BS 1 is re-configured, the method provides that the re-establishment of the UE is successful in a cell in the active status after re-configuration, and avoid a re-establishment failure.

In step 402, for a cell in the inactive status contained in the cell coverage modification list, the BS 2 may not initiate a handover to it.

For example, in a scenario where the cell C is split into the cell D and the cell E, the BS 2 receives the information from the BS 1. When the BS 2 initiates a handover of the UE to the cell C, it may contain information of the cell D and the cell E in re-establishment information of a handover request message. In this way, if during the handover, the cell C is split into the cell D and cell E, and the handover fails, the method provide successful re-establishment of the UE to the cell D or to the cell E. Corresponding to a scenario of cell shaping, e.g., re-configuration of the cell H, coverage of the cell H is changed due to cell shaping of the cell H, and the coverage change needs the neighboring cell M and cell N to change their coverage, or needs compensation by coverage of the neighboring cell M and cell N, the cell M and the cell N being associated cells of the cell H. When the BS 2 initiates a handover of the UE to the cell H, it may contain information of the cell M and the cell N in re-establishment information of a handover request message. In this way, if during the handover, the cell H is shaped, and the handover fails, the method provide successful re-establishment of the UE to the cell M or to the cell N.

If the BS 2 initiates a handover of UE to a cell of the BS 1, the BS 2 may contain information of a cell newly added or modified and in the inactive status, or a cell in the inactive status among coverage modification cells, or a coverage modification cell in re-establishment information of a handover request message. In this way, in case of a handover failure of the UE to the cell of the BS 1, if during the handover, a coverage modification cell is re-configured, the method provides success of re-establishment of the UE to a re-configured cell, and avoid re-establishment failure. For example, in the scenario where the cell C is split into the cell D and the cell E, the BS 2 receives the information from the BS 1. When the BS 2 initiates a handover of UE to the cell C of the BS 1, it may contain the information of the cell D and the cell E in re-establishment information of a handover request message. In this way, if during the handover, the cell C of the BS 1 is split into the cell D and the cell E, and for the UE in coverage of the cell D or in coverage of the cell E, the handover fails, the method provides successful re-establishment of the UE to the cell D or to the cell E. Corresponding to the scenario of cell shaping, e.g., re-configuration of the cell H, coverage of the cell H is changed due to cell shaping of the cell H, and the coverage change needs the neighboring cell M and cell N to change their coverage, or needs compensation by coverage of the neighboring cell M and cell N, the cell M and the cell N being associated cells of the cell H. When the BS 2 initiates a handover of the UE to the cell H, it may contain information of the cell M and the cell N in re-establishment information of a handover request message. In this way, if during the handover, the cell H is shaped, and for the UE under coverage of the cell M or under coverage of the cell N, the handover fails, the method provides successful re-establishment of the UE to the cell M or to the cell N.

According to any approach described in step 402, the BS 2 knows that the information on cell coverage modification received from the BS 1 is a notification before coverage modification, and the BS 2 does not release resources such as a PCI of a cell in the inactive status.

Till this point, description of the flowchart of the first self-optimization method which supports the cell coverage modification scenario provided according to embodiments of the present disclosure is completed. The method enables a BS to learn the status of a cell of a neighboring BS, which solves the problem of re-establishment failure of a radio resource connection, solves the problem of MRO, better uses system resources and radio resources, and better sets measurements and performs a handover.

Figure 6:
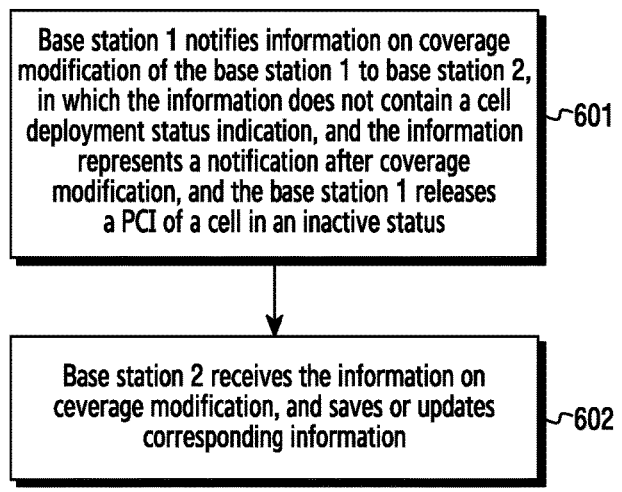
FIG. 6 illustrates a second self-optimization method which supports a cell coverage modification scenario provided according to embodiments of the present disclosure.

FIG. 6 illustrates a second self-optimization method which supports a cell coverage modification scenario provided according to embodiments of the present disclosure. The flow may be used for notification after cell coverage modification. As shown in FIG. 6, the flow includes the following process.

Step 601, BS 1 notifies BS 2 of information on cell coverage modification of the BS 1. The information on cell coverage modification does not contain a coverage deployment status indication, which indicates that the information on cell coverage modification is a notification after coverage modification, and the BS 1 releases resources, e.g., a PCI of a cell in the inactive status. The BS 1 saves an ECGI of the cell in the inactive status. The BS 1 may let the BS 2 know the information on cell coverage modification is a notification after coverage modification by an implicit approach, and a detailed process of which is the same as that in step 301, and will not be elaborated herein.

In the step 601, the information on cell coverage modification includes one or more kinds of following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the information on coverage modification may include a cell identity of a coverage modification cell, i.e., an ECGI; a cell coverage status of the coverage modification cell; a list of associated cells of the coverage modification cell; a coverage deployment status indication of the coverage modification cell, i.e., indicating whether the information on cell coverage modification is a notification before coverage modification or a notification after coverage modification. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

The cell coverage status is configured to indicate whether a corresponding cell is in the active status or in the inactive status. When the cell is in the active status, different values correspond to different cell coverage statuses.

For example, corresponding to the situation where the cell C under the BS 1 is split into the cell D and the cell E, and corresponding to notification after coverage modification, the cell coverage modification list includes the cell D, cell E, and the cell C. The statuses of the cell D and the cell E are active, and the status of the cell C is inactive.

Corresponding to the situation of cell shaping, e.g., re-configuration of the cell H, since the coverage change of the cell H is caused due to the cell shaping of the cell H, the coverage change of the cell H needs the neighboring cell M and cell N to change their coverage, or needs compensation by the coverage of the neighboring cell M and the cell M, the cell M and the cell N being associated cells of the cell H.

In step 601, the BS 1 releases a PCI of a cell in the inactive status.

Step 602, the BS 2 receives the information on cell coverage modification. The BS 2 saves the received information, e.g., information of a cell in the active status. The BS 2 saves or updates status information of a coverage modification cell.

In step 602, the BS 2 will not initiate a handover to a cell in the inactive status contained in the cell coverage modification list.

The BS 2 may know the information on cell coverage modification is a notification after coverage modification by three approaches, a detailed procedure of which is the same as that in step 402, and will not be elaborated herein.

The BS 2 decides to save and release context of a cell according to the received information. Based on the information on cell coverage modification received from the BS 1, the BS 2 knows that the information on cell coverage modification is an indication after coverage modification, e.g., no potential deployment indication or pre-notification being contained in the received information on cell coverage modification, and the BS 2 saves an ECGI and a MRO status of a cell in the inactive status. The BS 2 may release information such as a PCI of the cell in the inactive status. For example, corresponding to the situation where the cell C under the BS is split into the cell D and the cell E, corresponding to an indication after coverage modification, the cell coverage modification list includes the cell D, the cell E, and the cell C. The statuses of the cell D and cell E are active, and the status of the cell C is inactive. The BS 2 saves the ECGI and the MRO status of the cell C.

Till this point, description of the flowchart of the second self-optimization method which supports the cell coverage modification scenario provided according to embodiments of the present disclosure is completed. The method enables a BS to learn the status of a cell of a neighboring BS, which solves the problem of re-establishment failure of a radio resource connection and the problem of MRO, better uses system resources and radio resources, and better sets measurements and performs a handover.

Figure 7:
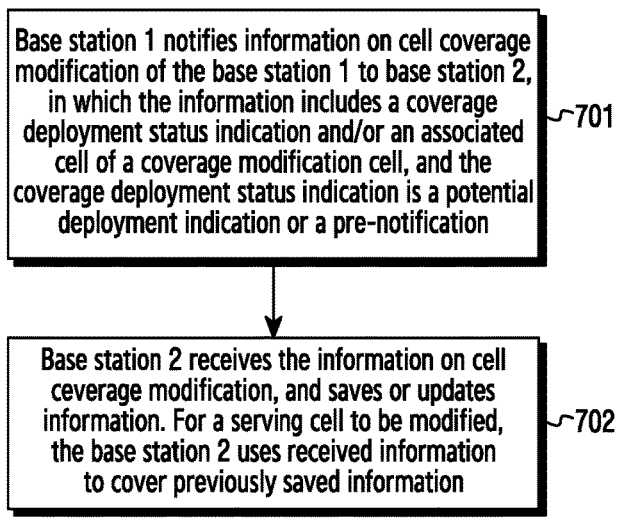
FIG. 7 illustrates a third self-optimization method which supports a cell coverage modification scenario provided according to embodiments of the present disclosure.

FIG. 7 illustrates a third self-optimization method which supports a cell coverage modification scenario provided according to embodiments of the present disclosure. The flow may be used for notification before cell coverage modification. As shown in FIG. 7, the flow may include the following process.

Step 701, BS 1 notifies information on cell coverage modification of the BS 1 to BS 2, and the information on cell coverage modification includes a coverage deployment status indication and/or an associated cell of a coverage modification cell, and the coverage deployment status indication is a potential deployment status indication or a pre-notification. The BS 1 may contain a cell whose information is to be modified in information of serving cells to be modified. The BS 1 may let the BS 2 know the information on cell coverage modification is a notification before coverage modification by implicit approaches, a detailed procedure of which is the same as that in step 301, and will not be elaborated herein.

In step 701, the information on cell coverage modification includes one or more kinds of following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the information on coverage modification may include a cell identity of the coverage modification cell, i.e., an ECGI; a cell coverage status of the coverage modification cell; a list of associated cells of the coverage modification cell; a coverage deployment status indication of the coverage modification cell, i.e., indicating whether the information on cell coverage modification is a notification before coverage modification or a notification after coverage modification. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

The cell coverage status is configured to indicate whether a corresponding cell is in the active status or in the inactive status, and when the cell is in the active status, different values correspond to different cell coverage statuses.

The list of associated cells of the coverage modification cell refers to one or more such cells as follows. For example, a cell whose coverage is to be modified is cell B, and a cell which is associated with the cell B is cell A. Then, when the cell A and the cell B are in the activate status, they may have common, or overlapped, or adjacent coverage. For example, in case of cell C being split into cell D and cell E, a cell which is associated with the cell D and cell E is the cell C. Corresponding to a situation where cell X and cell Y are merged as cell Z, cells which are associated with the cell Z are the cell X and the cell Y. For cell shaping, e.g., re-configuration of cell H, if coverage of the cell H is changed due to cell shaping of the cell H, and the coverage change of the cell H needs neighboring cell M and cell N to change their coverage, or needs compensation by coverage of the neighboring cell M and cell N, the cell M and the cell N are associated cells of the cell H.

Corresponding to a situation where the cell D and the cell E under the BS 1 are to be merged as the cell C, and corresponding to notification before the merging, information of the cell C will be included in information of serving cells to be modified sent from the BS 1 to the BS 2. The BS 1 may re-allocate resources such as a PCI for the cell C, and the re-allocated PCI may be contained in the information of serving cells to be modified sent from the BS 1 to the BS 2. The cell coverage modification list includes the cell C, and the status of the cell C is inactive. The associated cells of the cell C are the cell D and the cell E. The information on cell coverage modification includes a potential deployment indication or a pre-notification.

At step 702, the BS 2 receives the information on cell coverage modification. The BS 2 saves or updates information. The BS 2 saves information of serving cells to be added, or information of serving cells to be modified. The BS 2 saves status information of a coverage modification cell. The BS 2 saves information of an associated cell of a cell in the inactive status. For a serving cell to be modified, the BS 2 uses received information to cover previously saved information.

The BS 2 may know the received information on cell coverage modification is a notification before coverage modification by three approaches, a detailed procedure of which is the same as that in step 402, and will not be elaborated herein.

The BS 2 makes multiple preparations for a handover according to the received information on cell coverage modification. When the BS 2 initiates a handover to a cell of the BS 1, it may contain information of a coverage modification cell in re-establishment information of a handover request, which case for example may be applicable for the cell shaping scenario; or when the BS 2 initiates a handover to a cell of the BS 1, it may contain information of a cell in the inactive status among coverage modification cells in re-establishment information of a handover request; or when the BS 2 initiates a handover of the UE to a cell of the BS 1, it may contain information of a cell newly added or modified and in the inactive status in re-establishment information of a handover request; or when the BS 2 initiates a handover to a coverage modification cell, the BS 2 may contain information of an associated cell in the inactive status among the coverage modification cells or an associated cell information among the coverage modification cells in re-establishment information of a handover request. In this way, if during a handover, a cell of the BS 1 is re-configured, the method may ensure successful re-establishment of a UE in a cell in the active status after re-configuration, and avoids failure of re-establishment.

In step 702, for a cell in the inactive status contained in the cell coverage modification list, the BS 2 may not initiate a handover to it.

For example, in a scenario where the cell D and the cell E are merged as the cell C, and the BS 2 receives the information on cell coverage modification from the BS 1, when the BS 2 initiates a handover of the UE to the cell D or to the cell E, the information of the cell C may be contained in re-establishment information of a handover request message. In this way, if during the handover of the UE, the cell D and the cell E are merged as the cell C, and the handover of the UE fails, the method provides successful re-establishment of the UE to the cell C. Corresponding to a scenario of cell shaping, e.g., re-configuration of the cell H, coverage of the cell H is changed due to cell shaping of the cell H, and the coverage change needs the neighboring cell M and cell N to change their coverage, or needs compensation by coverage of the neighboring cell M and cell N, the cell M and the cell N being associated cells of the cell H. When the BS 2 initiates a handover of the UE to the cell H, it may contain information of the cell M and the cell N in re-establishment information of a handover request message. In this way, if during the handover, the cell H is shaped, and the handover fails, the method provides successful re-establishment of the UE to the cell M or to the cell N.

If the BS 2 initiates a handover of UE to a cell of the BS 1, the BS 2 may contain information of a cell newly added or modified and in the inactive status, or a cell in the inactive status among coverage modification cells, or a coverage modification cell in re-establishment information of a handover request message. In this way, in case of a handover failure of the UE to the cell of the BS 1, if during the handover, a coverage modification cell is re-configured, the method provides success of re-establishment of the UE to a re-configured cell, and avoid re-establishment failure. For example, in the scenario where the cell D and the cell E are merged as the cell C, the BS 2 receives the information on cell coverage modification from the BS 1, and the information on cell coverage modification contains a potential deployment indication or a pre-notification, and when the BS 2 initiates a handover of the UE to a cell of the BS 1, it may contain information of the cell C in re-establishment information of a handover request message. In this way, if during the handover, the cell D and the cell E of the BS 1 are merged as the cell C, and for a handover failure of the UE under coverage of the cell C, the method provides successful re-establishment of the UE to the cell C. Corresponding to the scenario of cell shaping, e.g., re-configuration of the cell H, coverage of the cell H is changed due to cell shaping of the cell H, and the coverage change needs the neighboring cell M and cell N to change their coverage, or needs compensation by coverage of the neighboring cell M and cell N, the cell M and the cell N being associated cells of the cell H. When the BS 2 initiates a handover of the UE to the cell H, it may contain information of the cell M and the cell N in re-establishment information of a handover request message. In this way, if during the handover, the cell H is shaped, and for the UE under coverage of the cell M or under coverage of the cell N, the handover fails, the method provides successful re-establishment of the UE to the cell M or to the cell N.

According to any approach described in step 402, the BS 2 knows that the information on cell coverage modification received from the BS 1 is a notification before coverage modification, and it is an indication before coverage modification, and the BS 2 does not release resources such as a PCI of a cell in the inactive status.

To this point, description of the flowchart of the third self-optimization method which supports the cell coverage modification scenario provided according to embodiments of the present disclosure is completed. The method enables a BS to know the status of a cell of a neighboring BS, which solves the problem of re-establishment failure of a radio resource connection and the problem of MRO, better uses system resources and radio resources, and better sets measurements and performs a handover.

Figure 8:
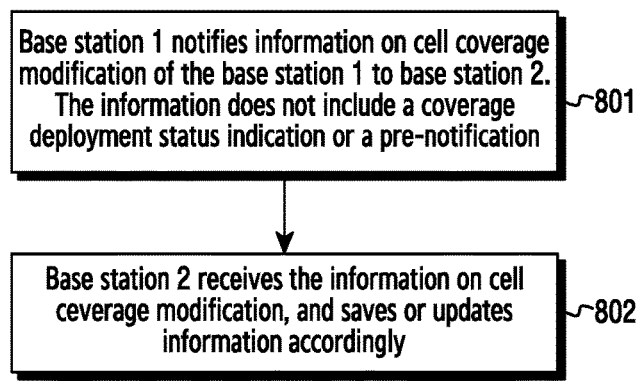
FIG. 8 illustrates a fourth self-optimization method which supports a cell coverage modification scenario provided according to embodiments of the present disclosure.

FIG. 8 illustrates a fourth self-optimization method which supports a cell coverage modification scenario provided according to embodiments of the present disclosure. The flow may be used for notification after cell coverage modification. As shown in FIG. 8, the flow includes the following process.

Step 801, the BS 1 notifies the BS 2 of information on cell coverage modification of the BS 1. The information on cell coverage modification does not contain a coverage deployment status indication, which indicates that the information on cell coverage modification is a notification after coverage modification, and the BS 1 releases resources such as a PCI of a cell in the inactive status. The BS 1 saves an ECGI of the cell in the inactive status. The BS 1 may let the BS 2 know the information on cell coverage modification is a notification after coverage modification by implicit approaches, a detailed procedure of which is the same as that in step 301, and will not be elaborated herein.

In step 801, the information on cell coverage modification may include one or more kinds of following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the information on coverage modification may include a cell identity of a coverage modification cell, i.e., an ECGI; a cell coverage status of the coverage modification cell; a list of associated cells of the coverage modification cell; a coverage deployment status indication of the coverage modification cell, i.e., indicating whether the information on cell coverage modification is a notification before coverage modification or a notification after coverage modification. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

The cell coverage status is configured to indicate whether the coverage modification cell is in the inactive status or in the active status, and when the coverage modification cell is in the active status, different values correspond to different cell coverage statuses.

For example, corresponding to a situation where cell D and cell E under the BS 1 are merged as cell C, corresponding to notification after coverage modification, a cell coverage modification list contains the cell D, the cell E, and the cell C. The status of the cell D and cell E are inactive. The status of the cell C is active.

The BS 1 may release a PCI of a cell in the inactive status.

Step 802, the BS 2 receives the information on cell coverage modification. The BS 2 saves or updates information, e.g., information of a cell in the active status. The BS 2 stores or updates status information of the coverage modification cell.

For a cell in the inactive status contained in the cell coverage modification list, the BS 2 does not initiate a handover to the corresponding cell.

The BS 2 may know the received information on cell coverage modification is a notification after coverage modification through three approaches, and a detailed procedure of which is the same as that in step 402, and will not be elaborated herein.

The BS 2 decides to save and release context of a cell according to the received information. Based on the information on cell coverage modification received from the BS 1, the BS 2 learns that the information on cell coverage modification is a notification after coverage modification, e.g., no potential deployment indication or pre-notification being contained in the received information on cell coverage modification, and the BS 2 saves an ECGI and a MRO status of a cell in the inactive status. The BS 2 may release information such as a PCI of the cell in the inactive status.

For example, corresponding to the situation where the cell D and the cell E under the BS 1 are merged as the cell C, corresponding to indication after coverage modification, the cell coverage modification list contains the cell D, the cell E, and the cell C. The status of the cell D and the cell E are both inactive. The status of the cell C is active. The BS 2 saves ECGIs and MRO status of the cell D and cell E. The BS 2 may release PCIs of the cell D and cell E.

To this point, description of the flowchart of the fourth self-optimization method which supports the cell coverage modification scenario provided according to embodiments of the present disclosure is completed. The method enables a BS to learn the status of a cell of a neighboring BS, which solves the problem of re-establishment failure of a radio resource connection and the problem of MRO, better uses system resources and radio resources, and better sets measurements and performs a handover.

Figure 9:
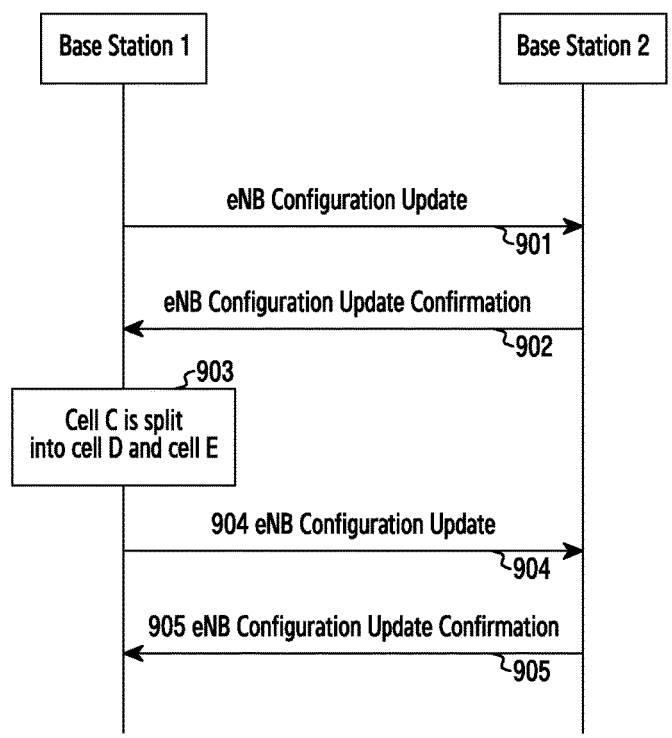
FIG. 9 illustrates a first embodiment of the self-optimization method which supports a cell coverage modification scenario provided according to embodiments of the present disclosure.

FIG. 9 illustrates a first embodiment of the self-optimization method which supports a cell coverage modification scenario provided according to embodiments of the present disclosure. In the present embodiment, cell C controlled by BS 1 is split into cell D and cell E. As shown in FIG. 9, the flow includes the following process.

Step 901, the BS 1 sends an eNB configuration update message to the BS 2.

The eNB configuration update message includes one or more kinds of following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the configuration update message may include a cell identity of a coverage modification cell, i.e., an ECGI; a cell coverage status of the coverage modification cell; a list of associated cells of the coverage modification cell; a coverage deployment status indication of the coverage modification cell, i.e., indicating whether the eNB configuration update message is a notification before coverage modification or a notification after coverage modification. The BS 1 may let the BS 2 know the eNB configuration update message is a notification before coverage modification by an implicit approach, a detailed procedure of which is the same as that in step 301, and will not be elaborated herein. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

Corresponding to the present embodiment, a cell coverage modification list includes the cell D and the cell E. Cell coverage status of the cell D and cell E are inactive. An associated cell of the cell D and cell E is the cell C. The eNB configuration update message is a notification before coverage modification. The eNB configuration update message contains an indication of potential deployment or a pre-notification, or does not contain the indication, but the BS 1 let the BS 2 know this is a notification before coverage modification by an implicit approach, and a detailed procedure of which is the same as that in step 301, and will not be elaborated herein.

Information of the cell D and cell E is contained in information of serving cells to be added contained in the eNB configuration update message sent from the BS 1 to the BS 2. If after an X2 interface between the BS 1 and the BS 2 is established, the cell C is to be split into the cell D and the cell E for the first time, i.e., the information of the cell D and cell E having not been notified to the BS 2, then the information of the cell D and cell E will be contained in the information of the served cell to be added contained in the eNB configuration update message sent from the BS 1 to the BS 2. If it is not the first time that the cell C is to be split into the cell D and the cell E, i.e., the information of the cell D and cell E having been notified to the BS 2, then the information of the cell D and cell E is contained in information of served cell to be modified contained in the eNB configuration update message sent from the BS 1 to the BS 2, and the BS 1 may re-allocate PCI for the cell D and cell E.

Step 902, the BS 2 receives the eNB configuration update message. The BS 2 saves received information, e.g., the information of the cell D and cell E, and/or the information that the associated cell of the cell D and cell E is the cell C. The BS 2 sends an eNB configuration update acceptance message to the BS 1.

The BS 2 may know the received eNB configuration update message is a notification before coverage modification by three approaches, and a detailed procedure of which is the same as that in step 402, and will not be elaborated herein.

The BS 2 will not initiate a handover to a cell in the inactive status contained in the cell coverage modification list, e.g., the cell D and the cell E. If the BS 2 initiates a handover of the UE to the associated cell C of the coverage modification cells, then the BS 2 may contain information of the coverage modification cells, i.e., the cell D and the cell E, in re-establishment cell information of a handover request message. In this way, in case of a failure of the handover of the UE to the cell C, if during the handover, the cell C is split into the cell D and the cell E, the method provides successful re-establishment of the UE to the cell D or to the cell E, and avoid a re-establishment failure.

If the BS 2 initiates a handover of the UE to a cell of the BS 1, then the BS 2 may contain the information of the coverage modification cells, i.e., the cell D and the cell E, in re-establishment cell information of a handover request message. In this way, in case of a failure of the handover of the UE to the cell of the BS 1, if during the handover, the cell C is split into the cell D and the cell E, for the UE under coverage of the cell D or the cell E, the method provides successful re-establishment of the UE to the cell D or to the cell E, and avoid a re-establishment failure.

According to the eNB configuration update message received from the BS 1, the BS 2 determines it is a notification before coverage modification, and the BS 2 does not release resources of the cells in the inactive status, e.g., PCI of the cell D and the cell E.

Step 903, the cell C of the BS 1 is split into the cell D and the cell E.

Step 904, the BS 1 sends an eNB configuration update message to the BS 2.

The eNB configuration update message contains one or more kinds of following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the configuration update message may include a cell identity of a coverage modification cell, i.e., an ECGI; a cell coverage status of the coverage modification cell; a list of associated cells of the coverage modification cell; a coverage deployment status indication of the coverage modification cell, i.e., indicating whether the eNB configuration update message is a notification before coverage modification or a notification after coverage modification. The BS 1 may let the BS 2 know the eNB configuration update message is a notification before coverage modification by an implicit approach, a detailed procedure of which is the same as that in step 301, and will not be elaborated herein. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration.

The cell coverage status is configured to indicate whether a corresponding cell is in the inactive status, or in the active status, and different values correspond to different cell coverage status when the cell is in the active status.

In the situation where the cell C under the BS 1 is split into the cell D and the cell E, corresponding to a notification after coverage modification, a cell coverage modification list contains the cell D, the cell E, and the cell C. The status of the cell D and cell E are active. The status of the cell C is inactive. Corresponding to the notification after coverage modification, the BS 1 may release resources such as the PCI of the cell C. The BS 1 saves the ECGI of the cell C.

Step 905, the BS 2 receives the eNB configuration update message. The BS 2 saves received information, e.g. information of the cells in the active status. The BS 2 sends an eNB configuration update acceptance message to the BS 1.

The BS 2 may know the received eNB configuration update message is a notification after coverage modification by three approaches, a detailed procedure of which is the same as that in step 402, and will not be elaborated herein.

Corresponding to a cell in the inactive status contained in the cell coverage modification list, the BS 2 does not initiate a handover to the cell.

According to the eNB configuration update message received from the BS 1, the BS 2 knows this is a notification after coverage modification; the BS 2 saves an ECGI and a MRO status of a cell in the inactive status. The BS 2 releases information such as a PCI of the cell in the inactive status. The BS 2 retrieves a MRO status of a cell in the active status. Corresponding to the situation where the cell C under the BS is split into the cell D and the cell E, corresponding to notification after coverage modification, the cell coverage modification list contains the cell D, the cell E, and the cell C, in which the status of the cell D and the cell E are active, and the status of the cell C is inactive. The BS 2 saves the ECGI and the MRO status of the cell C. The BS 2 may release the PCI of the cell C. The BS 2 retrieves the MRO status of the cell D and cell E.

To this point, description of the first embodiment of the self-optimization method which supports the cell coverage modification scenario provided according to the embodiments of the present disclosure is completed. Through the method, a BS is able to know the status of a cell of a neighboring BS, which solves the problem of Radio Resource Control (RRC) re-establishment failure, releases a PCI of a cell in the inactive status in time, avoids lack of physical resources and PCI conflicts, better uses system resources and radio resources, and better sets measurements and performs a handover.

Figure 10:
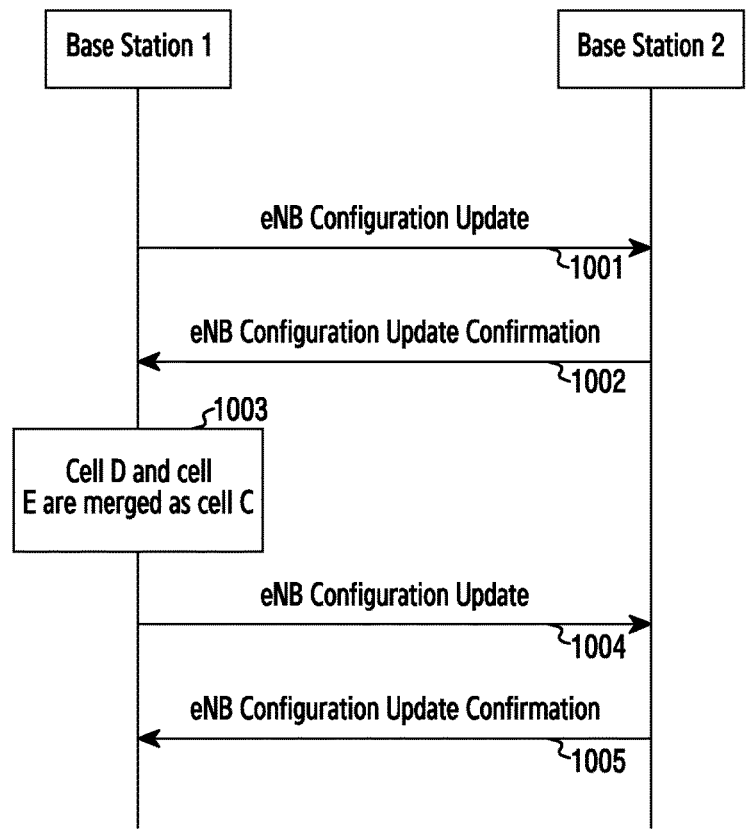
FIG. 10 illustrates a second embodiment of the self-optimization method which supports a cell coverage modification scenario provided according to embodiments of the present disclosure.

FIG. 10 illustrates a second embodiment of the self-optimization method which supports a cell coverage modification scenario provided according to embodiments of the present disclosure. In the present embodiment, cell D and cell E controlled by BS 1 are merged as cell C. As shown in FIG. 10, the flowchart includes the following process.

Step 1001, the BS 1 sends an eNB configuration update message to the BS 2.

The eNB configuration update message includes one or more kinds of the following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the configuration update message may include a cell identity of a coverage modification cell, i.e., an ECGI; a cell coverage status of the coverage modification cell; a list of associated cells of the coverage modification cell; a coverage deployment status indication of the coverage modification cell, i.e., indicating whether the eNB configuration update message is a notification before coverage modification or a notification after coverage modification. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration. The BS 1 may let the BS 2 know that the eNB configuration update message is a notification before coverage modification by an implicit approach, a detailed procedure of which is the same as that described in step 301, and will not be elaborated herein. The cell coverage status is configured to indicate whether a corresponding cell is in the active status or in the inactive status, and when the cell is in the active status, different values correspond to different cell coverage status.

Corresponding to the situation where the cell D and the cell E under the BS 1 are to be merged into the cell C, corresponding to notification before merging, information of the cell C is contained in information on served cell to be modified contained in the eNB configuration update message sent from the BS 1 to the BS 2. The BS 1 may re-allocate resources such as a PCI for the cell C, and the information of the serving cell C to be modified contained in the eNB configuration update message sent from the BS 1 to the BS 2 may include the re-allocated PCI. Information on cell coverage modification list contains the information of the cell C, and the status of the cell C is inactive. Associated cells of the cell C are the cell D and the cell E. The eNB configuration update message contains an indication of potential future deployment, or does not contain the indication. The BS 1 may let the BS 2 know the eNB configuration update message is a notification before coverage modification by an implicit approach, a detailed procedure of which is the same as that in step 301, and will not be elaborated herein.

Step 1002, the BS 2 receives the eNB configuration update message. The BS 2 saves or updates information, e.g., the information of the cell C in the inactive status, and/or information of the cell D and the cell E which are associated with the cell C in the inactive status. The BS 2 sends an eNB configuration update acceptance message to the BS 1.

The BS 2 may know the received eNB configuration update message is a notification before coverage modification by three approaches, a detailed procedure of which is the same as that in step 402, and will not be elaborated herein.

For the cell C in the inactive status contained in the cell coverage modification list, the BS 2 will not initiate a handover to a corresponding cell. If the BS 2 initiates a handover of the UE to the cell D or the cell E associated with the coverage modification cell C, then the BS 2 may contain information of the cell C in cell re-establishment information of a handover request message. In this way, in case of a failure of the handover of the UE to the associated cell D or cell E, if during the handover procedure, the cell D and the cell E are merged as the cell C, the method provides successful re-establishment of the UE to the cell C, and avoid a re-establishment failure.

In the scenario where the cell D and the cell E are merged as the cell C, the BS 2 receives the eNB configuration update message from the BS 1. When the BS 2 initiates a handover of the UE to a cell of the BS 1, it may contain information of the cell C in re-establishment information of a handover request message. In this way, if during the handover, the cell D and the cell E under the BS 1 are merged as the cell C, and for the UE under coverage of the cell C, its handover fails, the method provides successful re-establishment of the UE to the cell C.

According to the eNB configuration update message received from the BS 1, the BS 2 determines this is a notification before coverage modification, and the BS 2 does not release the resources of the cell C in the inactive status, e.g., PCI information.

Step 1003, the cell D and the cell E of the BS 1 are merged as the cell C.

Step 1004, the BS 1 sends an eNB configuration update message to the BS 2.

The eNB configuration update message includes one or more kinds of following information: a cell identity of a cell with modified coverage, i.e., an ECGI; a cell coverage status of the cell with modified coverage; cell replacing information related to the cell with modified coverage; a coverage deployment status indication of the cell with modified coverage, i.e., indicating whether the information on coverage modification is a pre-notification of cell re-configuration or post-notification. That is, the configuration update message may include a cell identity of a coverage modification cell, i.e., an ECGI; a cell coverage status of the coverage modification cell; a list of associated cells of the coverage modification cell; a coverage deployment status indication of the coverage modification cell, i.e., indicating whether the eNB configuration update message is a notification before coverage modification or a notification after coverage modification. The information on coverage modification comprises cell replacing information related to the cell with modified coverage, when the information on coverage modification includes the cell deployment status indicator. The cell deployment status indicator in the information on coverage modification indicates that the cell coverage status is planned to be used at next re-configuration. The BS 1 may let the BS 2 know the eNB configuration update message is a notification after coverage modification by an implicit approach, a detailed procedure of which is the same as that in step 301, and will not be elaborated herein.

The cell coverage status is configured to indicate whether a corresponding cell is in the active status or in the inactive status, and when the cell is in the active status, different values correspond to different cell coverage status.

Corresponding to the situation where the cell D and the cell E under the BS 1 are merged into as cell C, for notification after coverage modification, a cell coverage modification list contains the cell D, the cell E, and the cell C. The status of the cell D and cell E are inactive, and the status of the cell C is active.

The BS 1 may release PCIs of the cell C and cell E. The BS 1 saves ECGIs of the cell D and cell E.

Step 1005, the BS 2 receives the eNB configuration update message. The BS 2 saves or updates information, e.g., information of a cell in the active status. The BS 2 saves or updates status information of a coverage modification cell. The BS 2 sends an eNB configuration update acceptance message to the BS 1.

The BS 2 may know the received eNB configuration update message is a notification after coverage modification by three approaches, a detailed procedure of which is same as that in step 402, and will not be elaborated herein.

Corresponding to a cell in the inactive status contained in the cell coverage modification list, the BS 2 does not initiate a handover to the corresponding cell.

According to the eNB configuration update message received from the BS 1, the BS 2 knows this is a notification after coverage modification, and the BS 2 saves an ECGI and a MRO status of the cell in the inactive status. The BS 2 may release information such as a PCI of the cell in the inactive status. The BS 2 retrieves a MRO status of a cell in the active status. Corresponding to the situation where the cell D and the cell E under the BS 1 are merged as the cell C, corresponding to notification after coverage modification, the cell coverage modification list contains the cell D, the cell E, and the cell C, in which the status of the cell D and cell E are inactive, and the status of the cell C is active. The BS 2 saves ECGIs and MRO statuses of the cell D and cell E. The BS 2 may release PCIs of the cell D and cell E. The BS 2 retrieves the MRO status of the cell C.

To this point, description of the second embodiment of the self-optimization method which supports the cell coverage modification scenario provided according to the embodiments of the present disclosure is completed. Through the method, a BS is able to know the status of a cell of a neighboring BS, which solves the problem of RRC re-establishment failure, releases a PCI of a cell in the inactive status in time, avoids lack of physical resources and PCI conflicts, better uses system resources and radio resources, and better sets measurements and performs a handover.

Figure 11:
FIG. 11 illustrates a schematic diagram of a structure of a self-configuration and self-optimization system provided according to embodiments of the present disclosure.

A system for self-configuration and self-optimization provided according to embodiments of the present disclosure is shown in FIG. 11. FIG. 11 illustrates a schematic diagram of the structure of the system for self-configuration and self-optimization. The system includes a BS which controls a coverage modification cell, and a second BS.

The BS which controls the coverage modification cell is configured to notify information on coverage modification to the second BS before or after cell re-configuration.

The second BS is configured to make multiple preparations for a handover, and/or save or update modification information of a coverage modification cell, and/or save or retrieve a MRO status of a modified cell according to the information on coverage modification.

A BS for self-configuration and self-optimization, which controls a coverage modification cell, is provided according to embodiments of the present disclosure. The BS includes a configuring module and an instructing module.

The configuring module is configured to perform cell re-configuration.

The instructing module is configured to notify information on coverage modification to a second BS before or after the cell re-configuration.

A second BS for self-configuration and self-optimization includes a receiving module and a processing module.

The receiving module is configured to receive information on coverage modification sent from a BS which controls a coverage modification cell.

The processing module is configured to make multiple preparations for a handover, and/or save or update modification information of a coverage modification cell, and/or save or retrieve a MRO status of a modified cell according to the received information on coverage modification.

Figure 12:
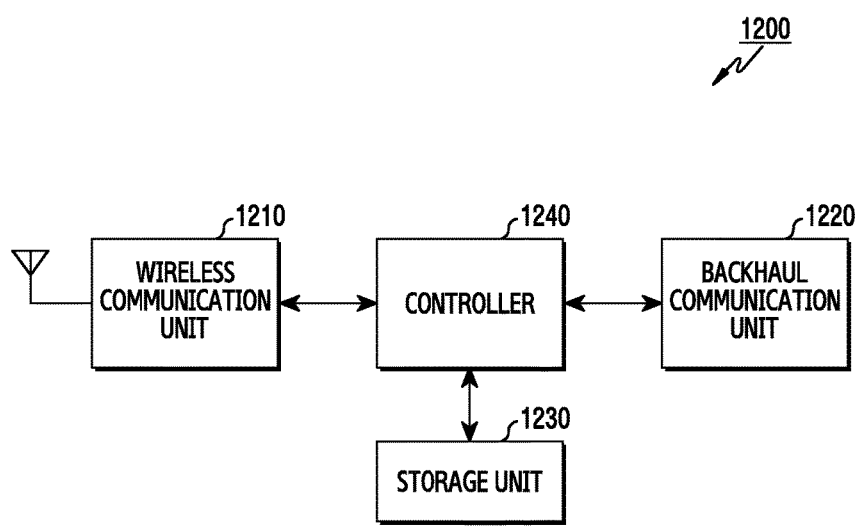
FIG. 12 illustrates block diagram of a base station (BS) in a wireless communication system according to an embodiment of the present disclosure.

FIG. 12 illustrates a block diagram of a BS 1200 in a wireless communication system according to an embodiment of the present disclosure. In one embodiment, the BS 1200 comprises the eNB 102 or the HeNB 103.

Referring to FIG. 12, the BS 1200 includes a wireless communication unit 1210, a backhaul communication unit 1220, a storage unit 1230, and a controller 1240.

The wireless communication unit 1210 executes functions for transmitting and receiving signals through a wireless channel. For example, the wireless communication unit 1210 executes a function of conversion between a baseband signal and a bit stream based on a physical layer standard of a system. When data is transmitted, the wireless communication unit 1210 encodes and modulates a transmission bit stream, so as to generate complex symbols. Also, when data is received, the wireless communication unit 1210 decodes and demodulates a baseband signal, so as to restore a reception bit stream. The wireless communication unit 1210 up-converts a baseband signal into an radio frequency (RF) band signal and transmits the RF band signal through an antenna, and down-converts an RF band signal received through the antenna into a baseband signal. The wireless communication unit 1210 may include a transmission filter, a reception filter, an amplifier, a mixer, an oscillator, a digital-to-analog converter (DAC), an analog-to-digital converter (ADC), and the like.

The wireless communication unit 1210 may include a plurality of RF chains. In addition, the wireless communication unit 1210 may perform beamforming. To execute beamforming, the wireless communication unit 1210 may adjust the phase and the size of each signal that is transmitted or received through a plurality of antennas or antenna elements.

The wireless communication unit 1210 may transmit and receive a signal as described above. Accordingly, the wireless communication unit 1210 may also be referred to as a transmitting unit, a transmitter, a receiving unit, a receiver, a transceiving unit or a transceiver. The transmission and reception performed through a wireless channel, which is described in the following descriptions, may be used as a meaning that includes that the above described processing is performed by the communication unit 1210.

The backhaul communication unit 1220 may provide an interface for performing the communication with other nodes in a network. The backhaul communication unit 1220 may convert, into a physical signal, a bit stream transmitted from the BS 1200 to another node (e.g., another access node, another BS, a core network, and the like), and may convert a physical signal received from the other node into a bit stream.

The storage unit 1230 may store data, such as a basic program, an application program, configuration information, or the like, used for operating the BS 1200. The storage unit 1230 may be configured as a volatile memory, a non-volatile memory, or a combination of a volatile memory and a non-volatile memory. In addition, the storage unit 1230 provides data stored therein in response to a request from the controller 1240.

The controller 1240 may control the general operations of the BS 1200. For example, the controller 1240 may transmit and receive signals through the wireless communication unit 1210 or the backhaul communication unit 1220. In addition, the controller 1240 may record and read data in the storage unit 1230. To this end, the controller 1240 may include at least one processor. According to embodiments of the present disclosure, the controller 1240 may control the handover procedure of a terminal, and may broadcast information associated with a sequence collision reported by the terminal. For example, the controller 1240 may control the BS 1200 to perform the procedures illustrated in FIGS. 3 to 11.

According to embodiments of the present disclosure, the controller 1240 may comprise the configuring module or the processing module, and a backhaul communication unit 1220 may comprise the instructing module or the receiving module.

Although the present disclosure has been described with embodiments, various changes and modifications may be suggested to one skilled in the art. It is intended that the present disclosure encompass such changes and modifications as fall within the scope of the appended claims.

What is claimed is:

1. A method for operating a first base station (BS) in a wireless communication network, the method comprising:
   transmitting a message including information on coverage modification including a cell coverage state of a cell with modified coverage and a cell identity (ID) of the cell with modified coverage, to a second BS;
   receiving an acknowledgement message from the second BS;
   if the information on coverage modification further includes a cell deployment status indicator of the cell with modified coverage, determining that the cell coverage state is planned to be used at a next cell reconfiguration; and
   if the information on coverage modification does not include the cell deployment status indicator of the cell with modified coverage, determining that the cell coverage state is used at cell reconfiguration.

2. The method of claim 1, wherein the second BS is a neighboring BS of the first BS or the second BS is connected with the first BS through an X2 interface, and
   wherein the cell reconfiguration includes cell splitting, cell merging, or cell shaping.

3. The method of claim 1, wherein the information on coverage modification further includes cell replacing information related to the cell with modified coverage, if the information on coverage modification further includes the cell deployment status indicator.

4. The method of claim 1, wherein the message further includes information of served cells to be modified or in information of served cells to be added.

5. The method of claim 1, wherein the cell deployment status indicator indicates that the message is for pre-change-notification of cell reconfiguration.

6. A first base station (BS) in a wireless communication network, the first BS comprising:
   a controller configured to perform cell reconfiguration; and
   a communication unit operably coupled to the controller, and configured to:
   transmit a message including information on coverage modification including a cell coverage state of a cell with modified coverage and a cell identity (ID) of the cell with modified coverage, to a second BS,
   receive an acknowledgement message from the second BS,
   if the information on coverage modification further includes a cell deployment status indicator of the cell with modified coverage, determine that the cell coverage state is planned to be used at a next cell reconfiguration, and
   if the information on coverage modification does not include the cell deployment status indicator of the cell with modified coverage, determine that the cell coverage state is used at cell reconfiguration.

7. The first BS of claim 6, wherein the second BS is a neighboring BS of the first BS or the second BS is connected with the first BS through an X2 interface; and
   wherein the cell reconfiguration includes cell splitting, cell merging, or cell shaping.

8. The first BS of claim 6, wherein the information on coverage modification further includes cell replacing information related to the cell with modified coverage, if the information on coverage modification further includes the cell deployment status indicator.

9. The first BS of claim 6, wherein the message further includes information of served cells to be modified or in information of served cells to be added.

10. The first BS of claim 6, wherein the cell deployment status indicator indicates that the message is for pre-change-notification of cell reconfiguration.

11. A second base station (BS) in a wireless communication network, the second BS comprising:
    a communication unit configured to receive a message including information on coverage modification including a cell coverage state of a cell with modified coverage and a cell identity (ID) of the cell with modified coverage, from a first BS; and
    a controller operably coupled to the communication unit, and configured to:
    operate for avoiding connection or re-establishment failure during a next cell reconfiguration based on the information on coverage modification, if the information on coverage modification further includes a cell deployment status indicator of the cell with modified coverage, and
    update configuration for the cell with modified coverage based on the information on coverage modification, if the information on coverage modification does not include the cell deployment status indicator of the cell with modified coverage.

12. The second BS of claim 11, wherein the first BS is a neighboring BS of the second BS, or the second BS is connected with the second BS through an X2 interface; and wherein the cell reconfiguration includes cell splitting, cell merging, or cell shaping.

13. The second BS of claim 11, wherein information on coverage modification further includes cell replacing information related to the cell with modified coverage, if the information on coverage modification further includes a cell deployment status indicator.

14. The second BS of claim 13, wherein the controller is further configured to prepare for handover related to the cell with modified coverage, based on the cell deployment status indicator and the cell replacing information.

15. The second BS of claim 11, wherein the controller is further configured to save or retrieve mobility robustness optimization (MRO) status of the cell with modified coverage according to the cell coverage state of the cell with modified coverage, if the information on coverage modification does not include the cell deployment status indicator of the cell with modified coverage.

* * * * *